United States Patent
Lee

(10) Patent No.: US 12,475,260 B2
(45) Date of Patent: Nov. 18, 2025

(54) NETWORKING DEVICE WITH PRIVACY PROTECTION

(71) Applicant: 5GEN CARE LIMITED, Hong Kong (HK)

(72) Inventor: Wai Hung Lee, Hong Kong (HK)

(73) Assignee: 5GEN CARE LIMITED, Hong Kong (HK)

( * ) Notice: Subject to any disclaimer, the term of this patent is extended or adjusted under 35 U.S.C. 154(b) by 268 days.

(21) Appl. No.: 17/921,101

(22) PCT Filed: Apr. 26, 2021

(86) PCT No.: PCT/CN2021/089812
§ 371 (c)(1),
(2) Date: Oct. 24, 2022

(87) PCT Pub. No.: WO2021/218889
PCT Pub. Date: Nov. 4, 2021

(65) Prior Publication Data
US 2023/0161917 A1    May 25, 2023

(30) Foreign Application Priority Data
Apr. 27, 2020  (HK) .......................... 32020006617.5

(51) Int. Cl.
*G06F 21/71* (2013.01)
(52) U.S. Cl.
CPC .................................... *G06F 21/71* (2013.01)
(58) Field of Classification Search
CPC ..................................................... G06F 21/71
See application file for complete search history.

(56) References Cited

U.S. PATENT DOCUMENTS

| 7,069,590 B1 * | 6/2006 | Malvar | H04K 1/02 |
| | | | 380/223 |
| 9,866,493 B2 * | 1/2018 | Deore | H04L 47/32 |
| 10,367,986 B1 * | 7/2019 | Berenberg | H04N 23/60 |

(Continued)

FOREIGN PATENT DOCUMENTS

| CN | 107038357 A | 8/2017 |
| CN | 107256353 A | 10/2017 |

(Continued)

OTHER PUBLICATIONS

European Search Report of corresponding European Patent Application No. 21797616.6 mailed on Jul. 15, 2024.

*Primary Examiner* — Carl G Colin
*Assistant Examiner* — Zhe Liu
(74) *Attorney, Agent, or Firm* — Idea Intellectual Limited; Sam T. Yip

(57) ABSTRACT

The present invention provides a networking device with privacy protection which can effectively disable one or more privacy features of the networking device without turning off the device, and remind the user of the disablement of the one or more privacy features such that hacking to the networking device is prevented and the primary purpose of using the device can be served as well. The networking device can also allow a user to remotely disable and enable the one or more privacy features of the networking device and partially maintain the basic functionality of the networking device even when the one or more privacy features are disabled.

19 Claims, 12 Drawing Sheets

(56) References Cited

U.S. PATENT DOCUMENTS

| | | | |
|---|---|---|---|
| 10,521,185 B1* | 12/2019 | Kim | H04R 3/00 |
| 2002/0065070 A1 | 5/2002 | Naiki | |
| 2010/0007513 A1* | 1/2010 | Horky | G08C 17/02 |
| | | | 340/12.22 |
| 2013/0017806 A1 | 1/2013 | Sprigg et al. | |
| 2013/0303133 A1 | 11/2013 | Sansalone | |
| 2013/0304817 A1* | 11/2013 | Hu | H04N 21/41407 |
| | | | 709/204 |
| 2014/0123208 A1 | 5/2014 | Plagemann et al. | |
| 2014/0250447 A1* | 9/2014 | Schink | H04N 21/478 |
| | | | 725/10 |
| 2015/0009332 A1* | 1/2015 | Fuhrmann | G07C 9/00 |
| | | | 348/155 |
| 2017/0201781 A1* | 7/2017 | Itwaru | H04N 21/4788 |
| 2018/0165472 A1* | 6/2018 | Adams | G06F 21/83 |
| 2018/0165473 A1 | 6/2018 | Debickes et al. | |
| 2018/0260581 A1* | 9/2018 | Adams | G06F 21/84 |
| 2019/0035404 A1* | 1/2019 | Gabel | G10L 15/22 |
| 2019/0108239 A1* | 4/2019 | Yang | G06Q 10/107 |
| 2019/0147874 A1* | 5/2019 | Mai | G10L 15/22 |
| | | | 704/275 |
| 2020/0112587 A1 | 4/2020 | Jakubowski et al. | |
| 2021/0081003 A1* | 3/2021 | Bristol | G06F 21/83 |
| 2022/0095392 A1* | 3/2022 | Matsumoto | H04W 4/021 |
| 2022/0318665 A1* | 10/2022 | Levy | G06F 21/566 |

FOREIGN PATENT DOCUMENTS

| | | |
|---|---|---|
| EP | 1499148 A2 | 1/2005 |
| EP | 2428906 A1 | 3/2012 |
| WO | 2007/011831 A2 | 1/2007 |

\* cited by examiner

NETWORKING DEVICE WITH PRIVACY PROTECTION

FIELD OF THE INVENTION

The present invention generally relates to a networking device with privacy protection, and particularly relates to a networking device capable to disable one or more privacy features and indicate to users the disablement of the one or more privacy features.

BACKGROUND OF THE INVENTION

As the rapid and wide spread of Internet of Things (IoT), more and more home appliances are IoT enabled devices with networking modules which allow them to connect to the internet and communicate with other IoT devices. IoT enabled devices provide us with many new capabilities, but they also introduce many potential security vulnerabilities and privacy concerns, especially at private areas such as homes where people may do whatever they like personally and secretly but would not want others to watch and see what they are doing.

Some IoT enabled home appliances may collect data of privacy concerns. For examples, doorbell camera installed in a house may collect visual image of visitors, area status outside of the house which may expose if the owner or his/her family are having activities outside the house, vacancy of car park lot which may indicate whether the owner is staying at home or going outside, daily routine time schedule. Voice controller installed in a house may collect audio clips of private conversation at homes, background sound at home, distance of family members in the house from a particular location, conversation between unknown person and your kids, purchase history, enquiry (weather, transportation, online shopping) history, number of family members, their name and their interest. Smart plugs and sockets may expose what kind of home appliances are being used and the usage of the home appliances. If a smart plug is used for a television, it is possible to know what channels are being watched. If a smart plug is used for lighting in a house, the daily schedule of the house owner may be correlated. The data collected by a mobile robot may have higher concerns as the mobile robot need to log down personal schedules, information, usage, regular behaviors, interests to take care many daily aspects of its users. An IoT enabled baby monitoring camera may collect not only video streams of a baby for its mother to know whether her baby is safe or has any needs to address, but may also collect video streams of the mother when she is breast feeding her baby.

However, many IoT enabled devices are vulnerable to be hacked when it is connected to the Internet even though they are protected with a password, secret key, encryption key or any other security measures.

The most effective way to prevent a device to be hacked is to turn it off since the device is not accessible anymore. However, by this way the primary purpose of using the device cannot be served until the user remembers to power on the device again. Also, it is difficult for the platform of the device to know user's intention of turning off the device. Moreover, some IoT enabled devices may not be equipped with any power off button. To power off these devices, users may need to pull the power adaptor from the electric socket. In some cases, it is very difficult to power off the devices since the power adaptor is not easily reachable.

Another way to prevent a device to be hacked is to block the connection of device to the home WIFI router. However, this is only one of privacy features and it is only possible for a very technical person to disable this feature.

SUMMARY OF THE INVENTION

It is one objective of the present invention to provide a networking device with privacy protection which can effectively disable one or more privacy features of the networking device without turning off the device, and remind the user of the disablement of the one or more privacy features such that hacking to the networking device is prevented and the primary purpose of using the device can be served as well.

It is another objective of the present invention to provide a networking device with privacy protection which allows a user to remotely disable and enable one or more privacy features of the networking device without turning off the device.

It is a further objective of the present invention to provide a networking device with privacy protection which allows the networking device to partially maintain the basic functionality of the networking device even when one or more privacy features are disabled.

According to one aspect of the present invention, the networking device with privacy protection comprising: a command detecting unit configured to receive one or more signals and convert the one or more signals to a command for disabling or enabling one or more privacy features of the networking device; a storage unit configured to store one or more predefined commands for disabling or enabling the one or more privacy features of the networking device; a processing unit configured to: determine whether the converted command is one of the predefined commands for disabling or enabling the one or more privacy features of the networking device; and disable or enable the one or more privacy features of the networking device when the converted command is one of the predefined commands for disabling or enabling the one or more privacy features of the networking device; an indicating unit configured to bear a noticeable appearance when the one or more privacy features are disabled.

BRIEF DESCRIPTION OF THE DRAWINGS

Embodiments of the invention are described in more detail hereinafter with reference to the drawings.

DETAILED DESCRIPTION

In the following description, for purposes of explanation, specific details are set forth in order to provide a thorough understanding of the embodiment of the disclosure. However, it will be apparent to practitioner skilled in the art that the present disclosure may be practiced without these specific details or with an equivalent arrangement.

Figure 1:
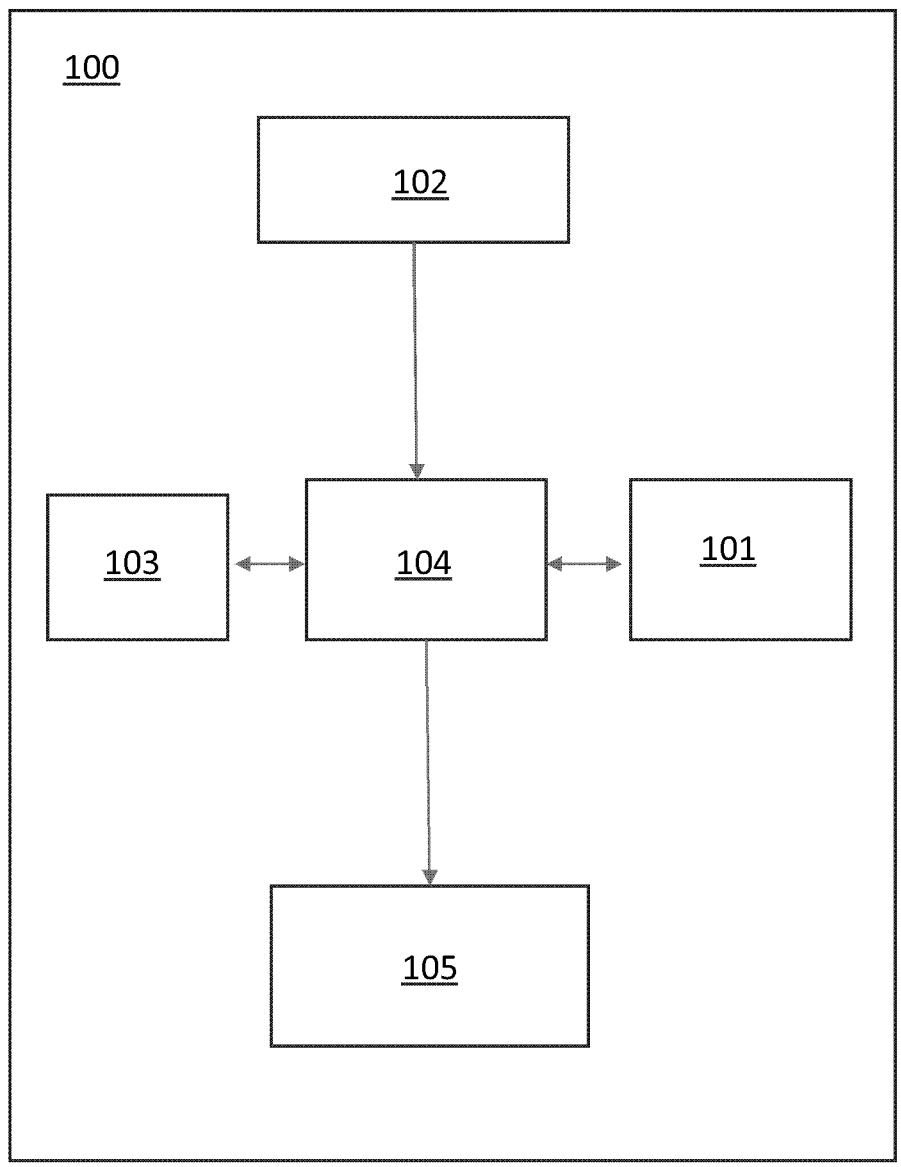
FIG. 1 depicts a block diagram of a networking device with privacy protection in accordance with an exemplary embodiment of the present invention.

Referring to FIG. 1. According to the present invention, a networking device 100 with privacy protection is provided. The networking device may comprise: one or more privacy features 101; a command detecting unit 102 configured to receive one or more signals and convert the one or more signals to a command for disabling or enabling the one or more privacy features of the networking device; a storage unit 103 configured to store one or more predefined commands for disabling and enabling the one or more privacy features of the networking device; a processing unit 104 configured to: determine whether the converted command is one of the predefined commands for disabling or enabling the one or more privacy features of the networking device; and disable or enable the one or more privacy features of the networking device when the converted command is one of the predefined commands for disabling or enabling the one or more privacy features of the networking device; and an indicating unit 105 configured to bear a noticeable appearance when the one or more privacy features are disabled.

The predefined commands for disabling or enabling one or more privacy features 101 may be pre-programmed in factory when the networking device 100 is manufactured, may be set up with a setup menu of the networking device or through an application program in a mobile device.

The disablement of the one or more privacy features 101 may be performed by putting the one or more privacy features 101 into a non-renderable state. As a result, potential hackers (or privacy invaders) cannot distinguish whether the data received from the target system is random or non-renderable due to non-decryptable or transmission errors. In other words, the potential hackers could not obtain any hints on whether the owner of the target system is aware of being snooped.

The non-renderable state can be achieved by powering off the one or more privacy features 101. Alternatively, the non-renderable state can be achieved by adding random data into input/output data of the one or more privacy features 101. Alternatively, the non-renderable state can be achieved by introducing noises into electrical signals received/generated by the one or more privacy features 101.

Figure 2A:
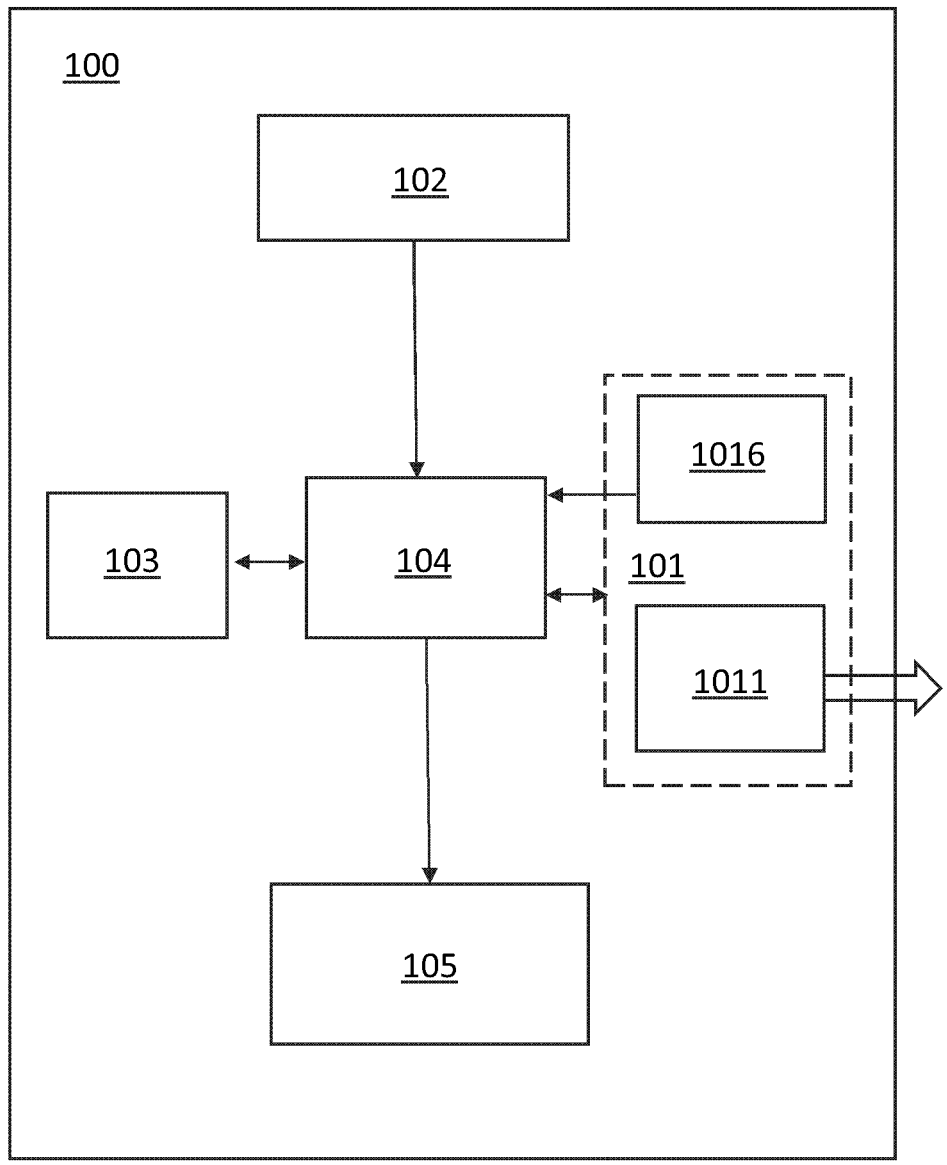
FIG. 2A depicts a block diagram of a networking device with privacy protection in accordance with an exemplary embodiment of the present invention.

Referring to FIG. 2A. Optionally, one or more privacy features 101 may include an internet access module 1011. The networking device 100 is configured to be able to operate locally when the internet access module is disabled for privacy protection.

The internet access module 1011 may be stopped from sending out communication data such that the internet access module is at a non-renderable state.

Alternatively, the one or more privacy features 101 may further comprise a random number generator 1016 configured to generate one or more random numbers. The processing unit 104 may be configured to randomize one or more generated communication data to the internet access module 1011 with the generated one or more random number so as to set the communication data to be non-renderable and put the internet access module 1011 to be in a non-renderable state.

In some embodiments, the one or more communication data may be randomized by replacing one or more bits of the communication data with the generated one or more random numbers.

Figure 2B:
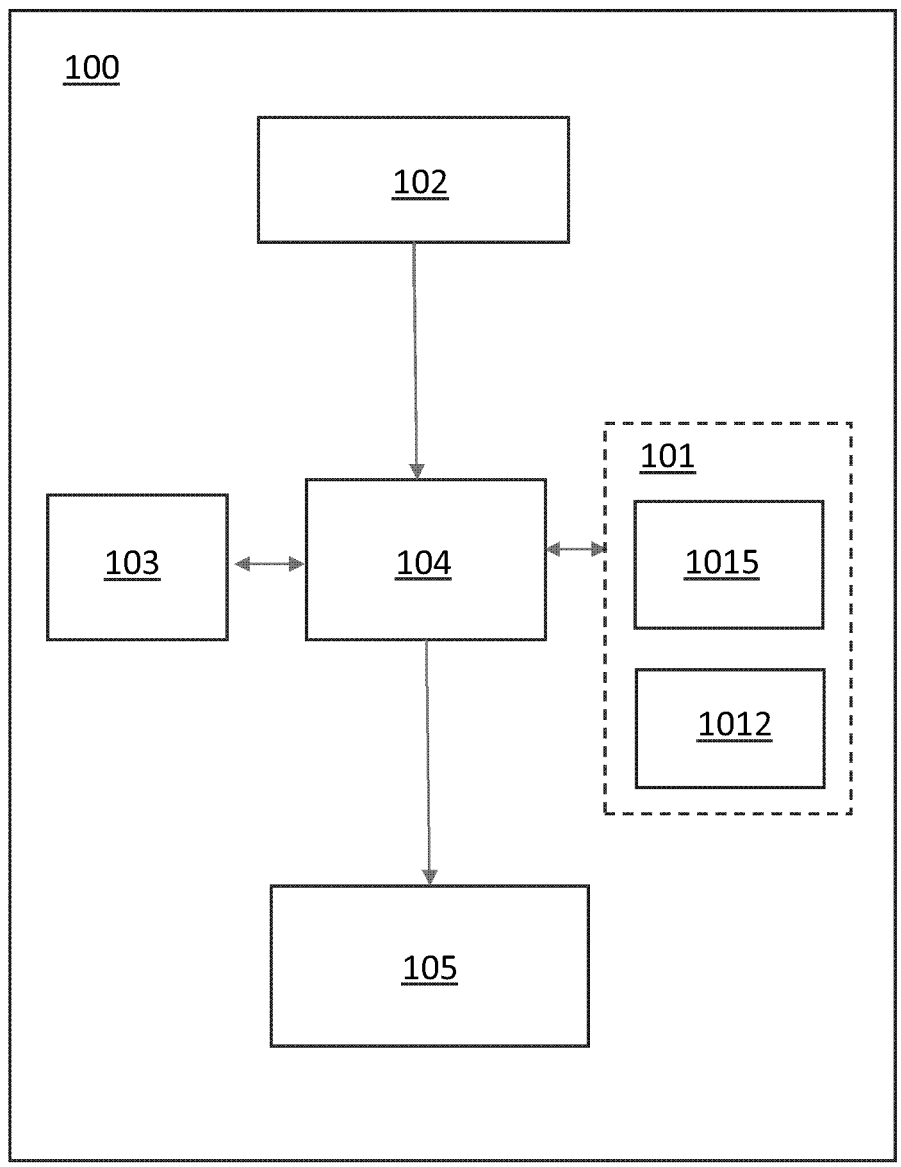
FIG. 2B depicts a block diagram of a networking device with privacy protection in accordance with an exemplary embodiment of the present invention.

Referring to FIG. 2B. Optionally, the one or more privacy features 101 may include an image sensor 1012 and the networking device 100 is configured to be unable to capture image or video signals when the image sensor is disabled for privacy protection.

The one or more privacy features 101 may further include an image signal processor 1015 configured for processing image and video signals captured by the image sensor 1012.

Alternatively, the image signal processor 1015 may be further configured to randomize the image and video signals captured by the image sensor 1012 so as to set the image and video signals to be non-renderable and put the image sensor 1012 to a non-renderable state.

Alternatively, the image signal processor 1015 may be configured to randomize one or more image processing parameters so as to set the one or more image and video signals to be non-renderable and put the image sensor 1012 to a non-renderable state.

Figure 2C:
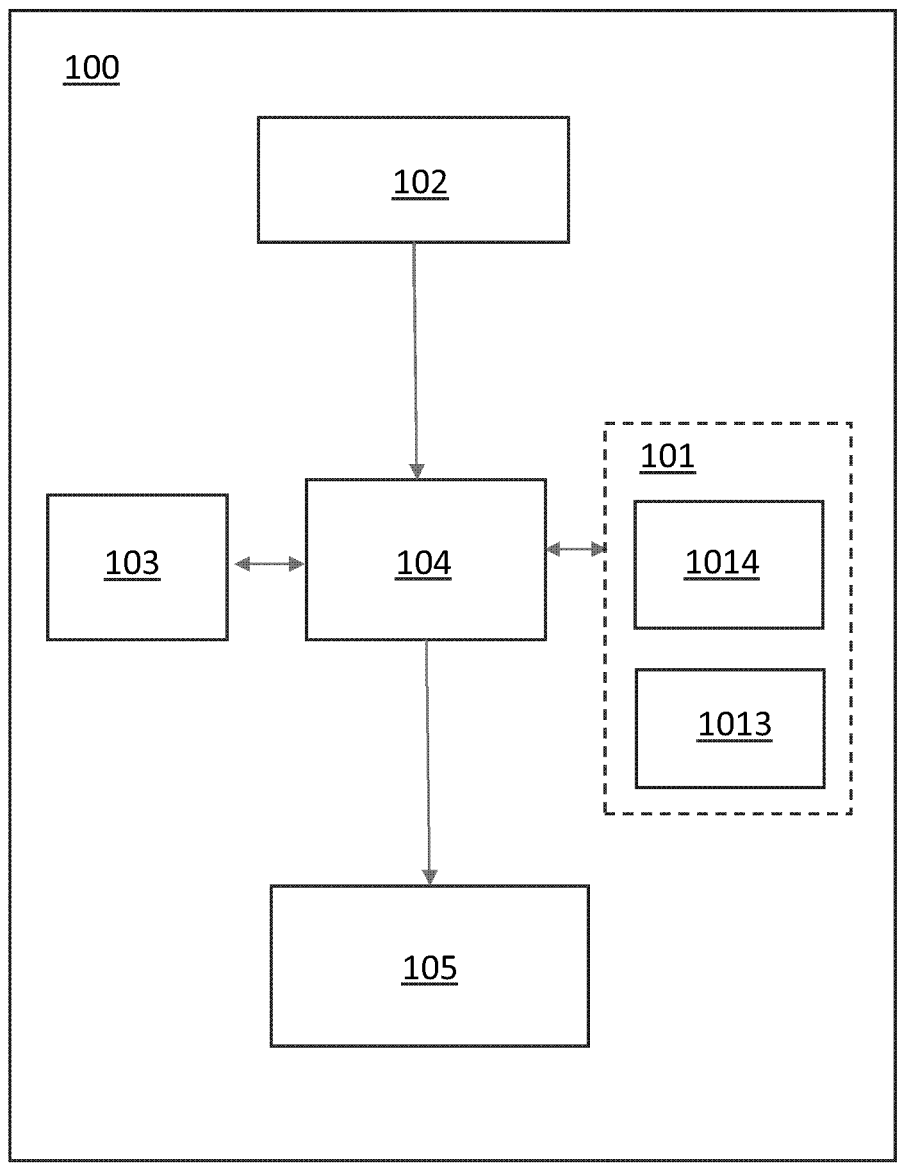
FIG. 2C depicts a block diagram of a networking device with privacy protection in accordance with an exemplary embodiment of the present invention.

Referring to FIG. 2C. Optionally, the one or more privacy features 101 may include a microphone sensor 1013 and the networking device 100 is not able to capture audio signals when the microphone sensor is disabled.

The microphone sensor 1013 may be configured to operate at a non-balance operation point such that audial data generated by the microphone sensor is distorted.

Alternatively, the one or more privacy features 101 may further comprise a noise generator 1014 positioned adjacent to the microphone sensor 1013 and configured to generate disturbing noises to audio signal to be captured by the microphone sensor 1013 so as to set the audio signal to be non-renderable and put the microphone sensor 1013 to a non-renderable state. The noise generator 1014 may be a magnetic-field generator or a white noise generator.

Figure 3A:
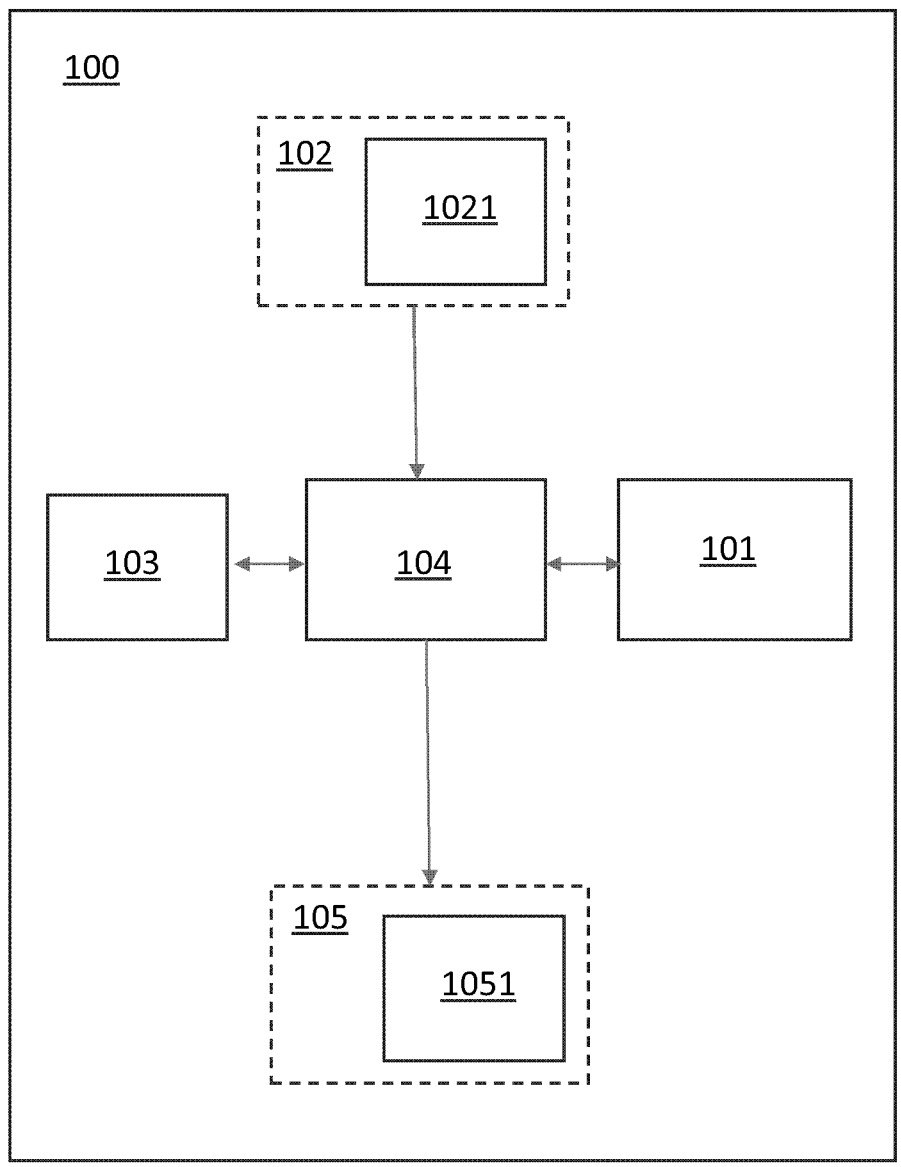
FIG. 3A depicts a block diagram of a networking device with privacy protection in accordance with an exemplary embodiment of the present invention.

In one embodiment as shown in FIG. 3A, the command detecting unit 102 may comprise a physical state-selection means 1021 for facilitating a user to generate one or more state-selection signals and is configured to convert the generated state-selection signals to the command for disabling or enabling one or more privacy features 101 of the networking device 100; and the indicating unit 105 may comprise a noticeable mark 1051 positioned on the physical state-selection means or next to the physical state-selection means for indicating the disablement of the one or more privacy features.

Preferably, the physical state-selection means 1021 may be a push button and the noticeable mark 1051 is positioned on the push button or next to the push button for indicating the disablement of one or more privacy features 101. Alternatively, the physical state-selection means may be a slide switch; and the noticeable mark is positioned on the slide switch or next the slid switch.

For example, the networking device 100 may be a monitoring camera such as a baby camera installed next to a baby crib or a home camera installed in a living room. The camera may have a two-state physical switch for disabling or enabling one or more privacy features 101 such as internet access of the camera. The user may use the physical switch to disable internet access of the camera when he/she wants a private period to avoid any potential chance to be watched remotely. When internet access is disabled, the network camera may still be powered on with all other functions operating. Moreover, the camera may further have a mark 1051 being positioned on or next to the physical switch. The appearance of the mark may have two states. At one state where the internet access feature is enabled, the mark may bear a color the same as or similar to the color of the camera body such that the physical switch is not noticeable to the user and acts as part of the camera body. At another state where the internet access feature is disabled, the mark may bear a sharp and intense color such as orange or red so that the physical switch as well as the disablement of the internet access is noticeable to the user. The color for the mark to provide warning message to the user about the disablement of any privacy feature may be selected to have intrinsic meaning to the user since a person seeing any unfamiliar appearance on the camera will instinctively notice that something has happened to the camera.

The mark 1051 may further comprise an indicator such as symbol, character or similar at a state where a privacy feature 101 is disabled. This form of indication will be particularly helpful to those colorblind users who cannot recognize the difference colors between the two states of the mark.

Figure 3B:
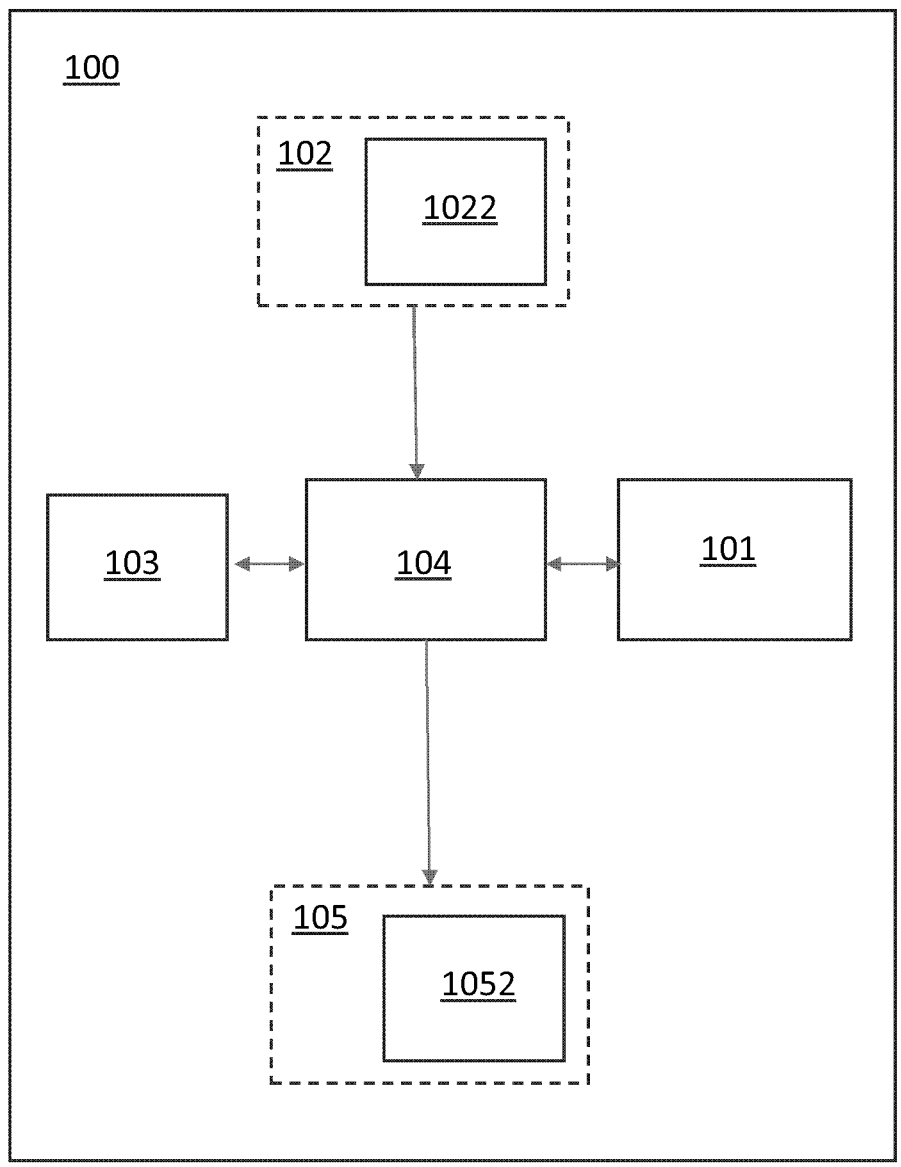
FIG. 3B depicts a block diagram of a networking device with privacy protection in accordance with an exemplary embodiment of the present invention.

In one embodiment as shown in FIG. 3B, the command detecting unit 102 may comprise an image capturing device 1022 configured for capturing facial expression or body gestures/languages of a user and be configured to convert the captured facial expression or body gestures of the user to the command for disabling or enabling one or more privacy features 101 of the networking device 100; and the indicating unit 105 may be a LED or any other electroluminescent indicators 1052. For example, a body language of the user may include a cross formed with two hands or two fingers in the air. When this body language is captured and converted to a command by the command detecting unit, and determined by the processing unit 104 to be one of the predefined commands for disabling a privacy feature such as internet access, the internet access will be disabled and the LED indicator will be lighted up to indicate the disablement of the internet access. This image recognition approach can be applied to networking cameras which are wall mounted at higher levels in order to cover more area to be monitored. In this situation, the camera body is not easily accessible and the user may need to use a tool to trigger any buttons or switches on the camera.

Figure 3C:
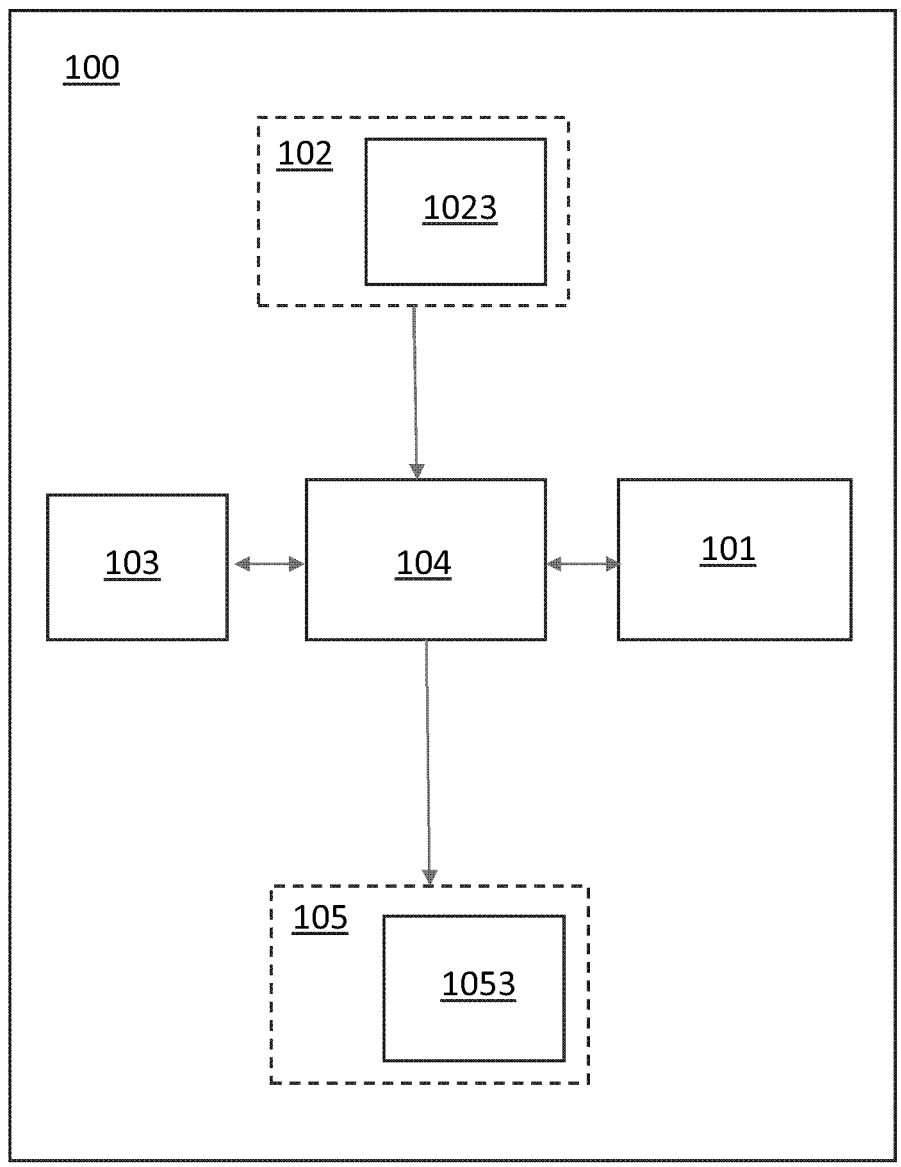
FIG. 3C depicts a block diagram of a networking device with privacy protection in accordance with an exemplary embodiment of the present invention.

In one embodiment as shown in FIG. 3C, the command detecting unit 102 may comprise a video capturing device 1023 configured for detecting direction of movement of a user relative to a reference position and be configured to convert the detected direction of movement of the user to the command for disabling or enabling one or more privacy features 101 of the networking device 100; and the indicating unit 105 may be a LED or any other electroluminescent indicators 1053. The reference position may be at a boundary of a monitoring area and the command detecting unit may be further configured to convert the detected direction of movement to a command for disabling the one or more privacy features of the networking device when the user is entering the monitoring area; and convert the detected direction of movement to a command for enabling the one or more privacy features of the networking device when the user is leaving the monitoring area. For example, the networking device may be a network camera of doorbell installed in a front door of a house. The video capturing device may be configured to detect direction of movement of a user relative to the front door and convert the detected direction of movement to a command for disabling the one or more privacy features of the network camera when the user is entering the house; and convert the detected direction of movement to a command for enabling the one or more privacy features of the network camera when the user is leaving the house.

Figure 3D:
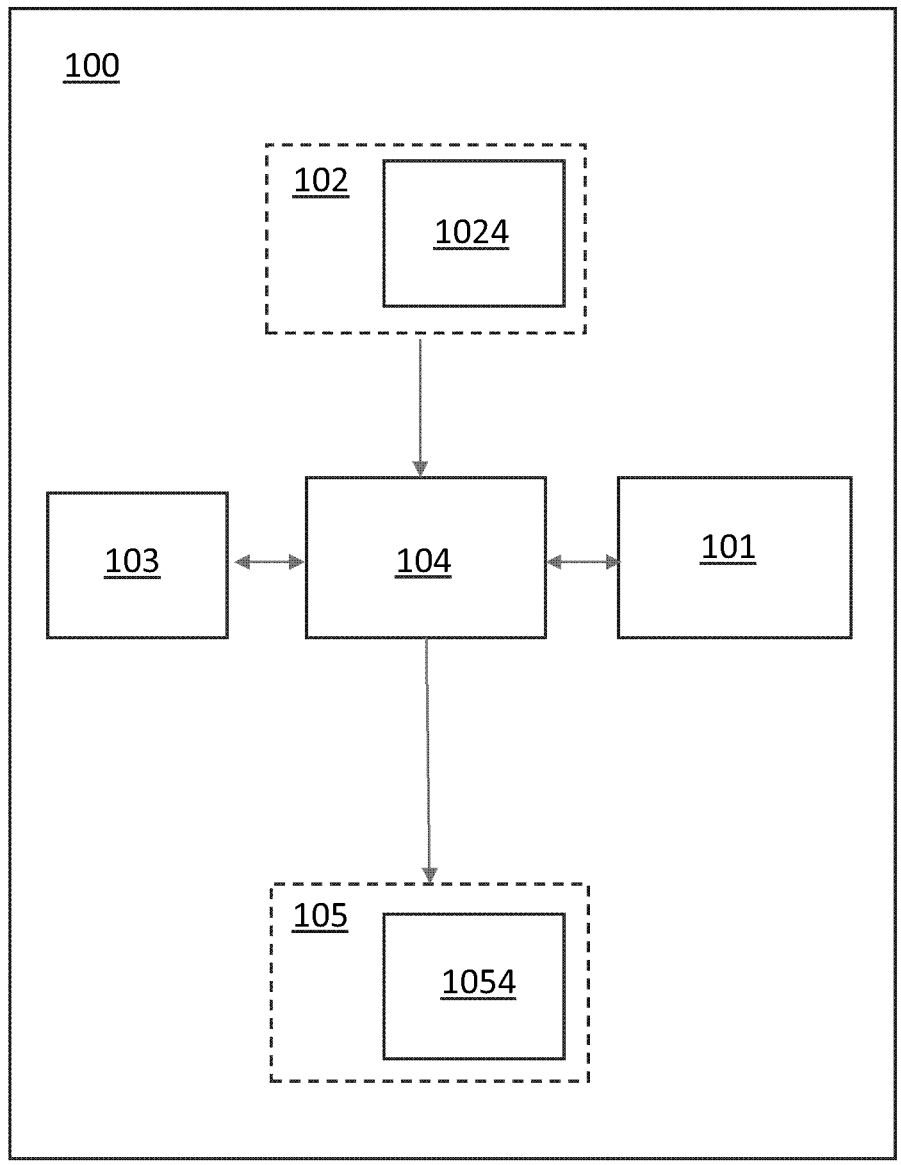
FIG. 3D depicts a block diagram of a networking device with privacy protection in accordance with an exemplary embodiment of the present invention.

In one embodiment as shown in FIG. 3D, the command detecting unit 102 may comprise a sound capturing device 1024 configured for capturing voices or sounds from a user or a monitoring area and be configured to convert the captured voices or sounds to the command for disabling or enabling one or more privacy features 101 of the networking device 100; and the indicating unit 105 may be a LED or any other electroluminescent indicators 1054. For example, sounds from a user may include a hand clapping sequence. In some cases, the hand clapping sequence may be similar to a Morse Code with short and long beats. When these sounds are captured and converted to a command by the command detecting unit, and determined by the processing unit 104 to be one of the predefined commands for disabling a privacy feature such as internet access, the internet access will be disabled and the LED indicator will be lighted up to indicate the disablement of the internet access. This sound recognition approach can provide a relatively large controllable region than the video or image recognition approaches since the sound capturing device can detect the sounds from a user located outside of sight of the camera. Also, the power consumption for sound recognition is lower than that for video or image recognition.

Figure 3E:
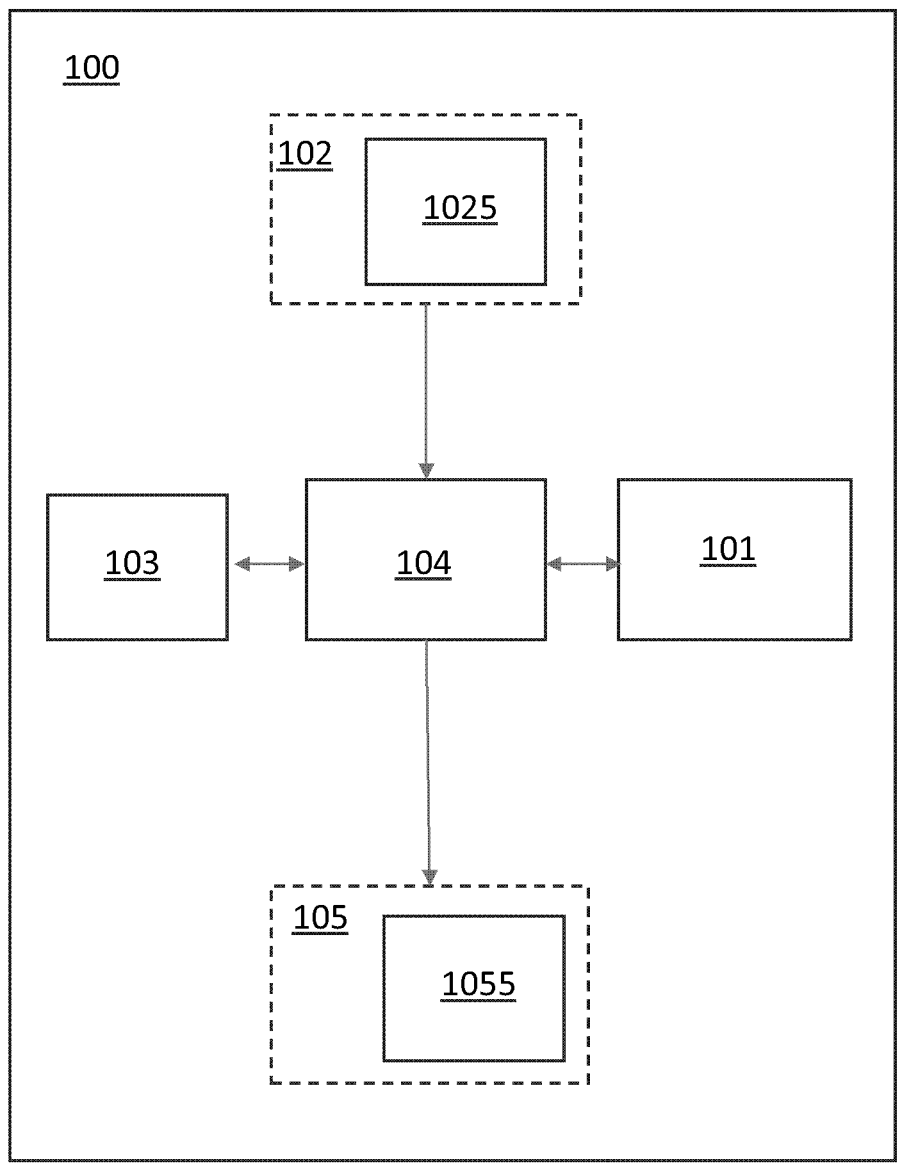
FIG. 3E depicts a block diagram of a networking device with privacy protection in accordance with an exemplary embodiment of the present invention.

In one embodiment as shown in FIG. 3E, the command detecting unit 102 may comprise a socket 1025 configured for receiving a pluggable module; and be configured to convert the plugging/unplugging of the pluggable module to the command for disabling or enabling one or more privacy features 101 of the networking device 100; and the indicating unit 105 may be a mark 1055 on the pluggable module. For example, the pluggable module may be in a form of a USB dangle and has a mark bearing a sharp and intense color such as orange or red so that the plugging of the pluggable module as well as the disablement of the one or more privacy features are noticeable to the user. The color for the mark to provide warning message to the user about the disablement of any privacy feature may be selected to have intrinsic meaning to the user since a person seeing any unfamiliar appearance on the camera will instinctively notice that something has happened to the camera. The mark may further comprise an indicator such as symbol, character or similar. This form of indication will be particularly helpful to those colorblind users who cannot recognize the color of the mark.

Figure 3F:
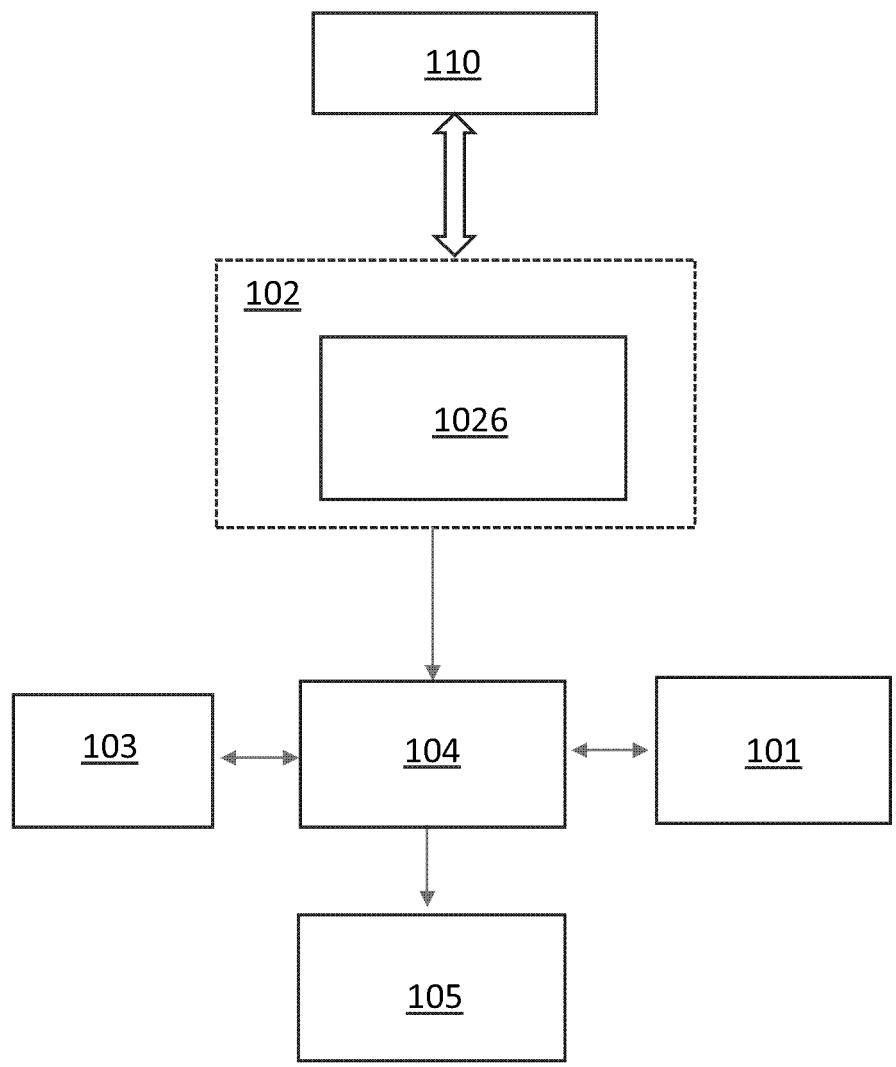
FIG. 3F depicts a block diagram of a networking device with privacy protection in accordance with an exemplary embodiment of the present invention.

In one embodiment as shown in FIG. 3F, the command detecting unit 102 may comprise a communication module 1026 configured to communicate through a short-range or mid-range communication channel with a remote-control unit 110 for facilitating a user to generate one or more remote-control signals and be configured to convert the generated remote-control signals to the command for disabling or enabling one or more privacy features 101 of the networking device 100.

The remote-control unit 110 may be a remote controller dedicated to the networking device 100 or a mobile phone of a registered user. Optionally, the remote-control unit may comprise a physical switch or soft key on display panel for disabling or enabling one or more privacy features 101. Moreover, the remote-control unit may comprise a display panel configured to indicate the status of the one or more privacy features. When a privacy feature is disabled with the physical switch, the display panel may be configured to show a symbol, icon or text so as to get user's attention and remind the user to enable the disabled privacy feature if required.

The communication module 1026 may be a Bluetooth Low Energy (BLE) module configured to communicate through a BLE channel with a remote-control unit 110 for facilitating a user to generate one or more remote-control signals. The radio coverage of a BLE channel is limited and depends on the home layout. Also, its data rate is relatively low. If the remote-control unit is a mobile phone and used by a user to disable one or more privacy features 101 through a BLE channel, it is still possible for the networking device 100 to send event notification and recorded audio to the mobile phone for security notice with audio only.

Alternatively, the communication module 1026 may be a 2.4 GHz RF module configured to communicate through a 2.4 GHz RF channel with a remote-control unit 110 for facilitating a user to generate one or more remote-control signals. The radio coverage of a 2.4 GHz RF channel is much better than a BLE channel. In some case, it can reach 100 to 200 meters. Therefore, a 2.4 GHz RF module is usually used for allowing a user to control and stream video captured by a networking camera. If one or more privacy features 101 are disabled, other features or functions of the networking camera can still be operated and controlled through the 2.4 GHz RF channel.

Figure 3G:
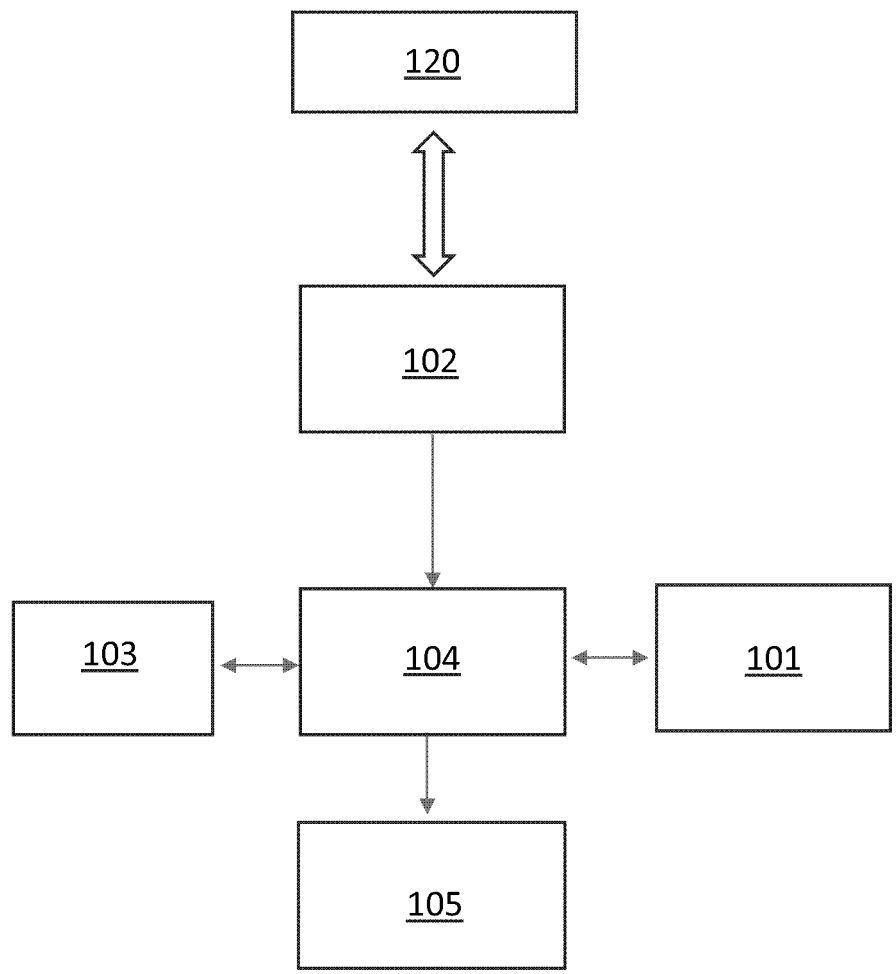
FIG. 3G depicts a block diagram of a networking device with privacy protection in accordance with an exemplary embodiment of the present invention.

In one embodiment as shown in FIG. 3G, the command detecting unit 102 may be further configured to detect availability of connectivity between the networking device 100 and a mobile device 120 of a registered user through a short-range network over a monitoring area and convert the detected availability of connectivity to a command for disabling one or more privacy features 101 of the networking device. Furthermore, the processing unit 104 may be configured to automatically resume the disabled privacy feature once the availability of connectivity between the networking device and the mobile device of the registered user is not detected by the command detecting unit.

In one embodiment, the command detecting unit 102 may be configured to transmit a list of historical and active connections to the mobile device 120 of the registered user and receive a command to stop the selected active connection from the mobile device of the registered user. The command detecting unit may further be configured to transmit notification to the mobile device of the registered user when one or more privacy features 101 are accessed by any users other than the registered user.

In one embodiment, the command detecting unit 102 may be further configured to transmit a notification signal to a mobile device 120 of a registered user when a command is converted from one or more signals which are not received from a non-reversable means and the converted command is determined to be one of the predefined commands for disabling one or more privacy features 101 of the networking device 100; and to receive from the mobile device of the registered user, a command associated with the notification signal. The processing unit 104 may be further configured to enable the one or more privacy features of the networking device if the command associated with the notification signal is a cancel command associated with the notification signal is received by the command detecting unit. The non-reversable means may be a physical state-selection means 1021 installed in the networking device, a remote-control unit 110 or a pluggable module.

In one embodiment, the networking device 100 may further comprise a controlling platform configured to allow different users access the networking device through a communication network from their mobile devices to control one or more privacy features 101.

The controlling platform of the networking device 100 may provide a user interface for a first user, usually the owner, to set up an owner's account and associate his/her mobile phone number to the owner's account.

The controlling platform may be configured to be accessed by means of a shared-account mechanism where multiple users login to the same account in the mobile app in order to access the networking device 100 in that account. Alternatively, the controlling platform may be configured to be accessed by means of a shared-device-to-multiple-accounts mechanism where different users use different individual accounts. By this mechanism, resources of the networking device are actively shared from the owner's account and then allocated among other user accounts on a request-and-grant basis.

Figure 4:
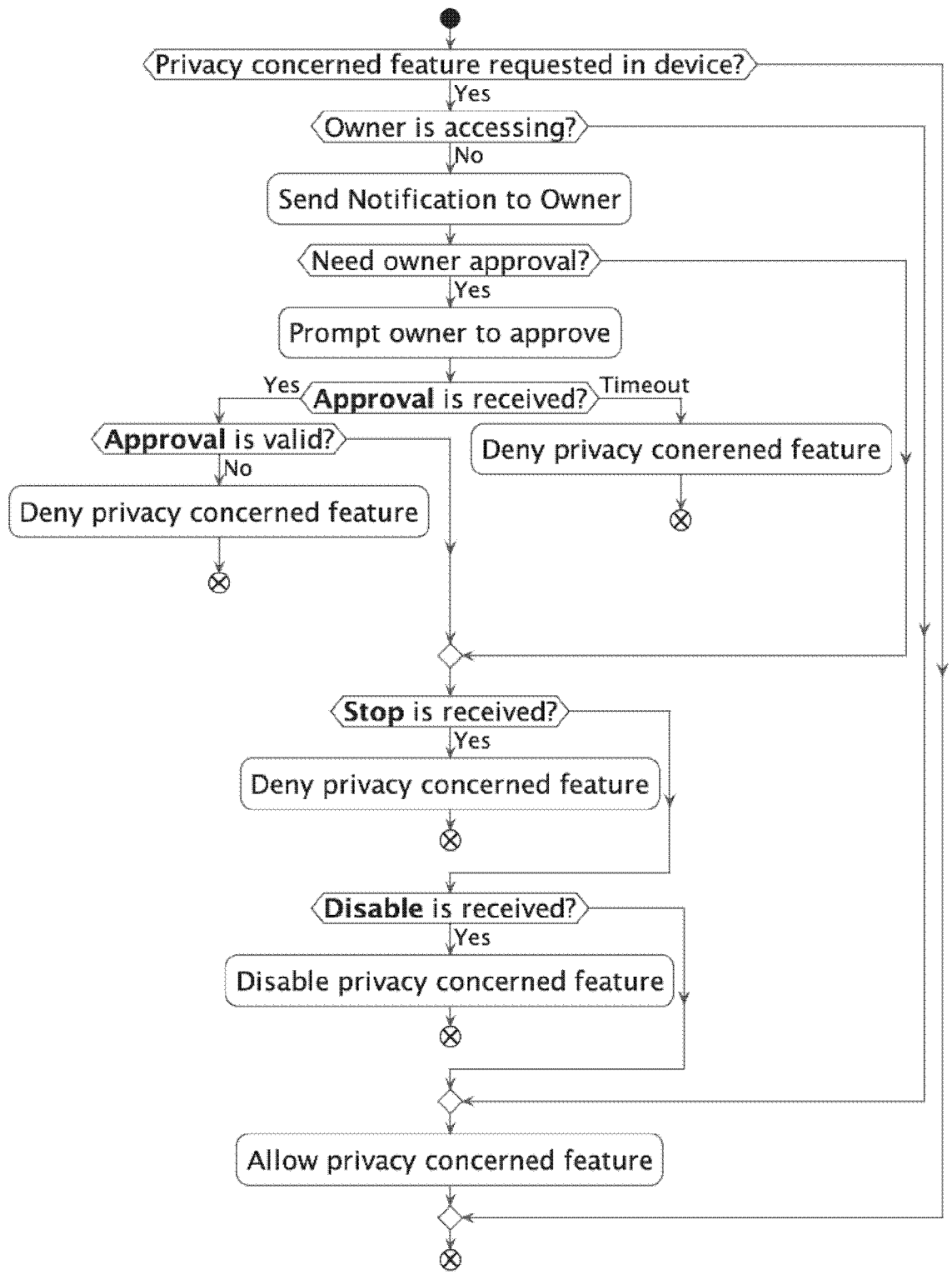
FIG. 4 depicts flowchart of handling a request for access to privacy feature associated with a networking device in accordance with an exemplary embodiment of the present invention.

For example, as shown in FIG. 4, when a requestor, who is a user other than the owner, wants to access a privacy feature, such as video streaming, of a networking device such as a network camera, he/she may send a request from his/her mobile device through the controlling platform. The controlling platform may be configured to send a push notification through short message service (SMS) or any other communication methods to the owner's mobile phone. If the owner sends an approval message associated with the push notification to the controlling platform through a corresponding mobile application to grant such request for access, the controlling platform will be configured to allow the requestor to access the privacy feature. If the owner sends a stop message through the corresponding mobile application to deny such request for access, this stop message will be received by the controlling platform which will be configured to stop the requestor to access the privacy feature. If the owner sends a disable message through the corresponding mobile application to deny such request for access, this disable message will be received by the controlling platform which will be configured to disable the requestor any future access to the privacy feature. If the owner does not send any message in response to the push notification in a pre-determined timeout, the controlling platform will be configured to allow the requestor to access the privacy feature.

The approval message sent by the owner may be a simple confirmation message so that the on-hold access by the requestor can be continued. The confirmation message may include a connection identification code for the controlling platform to find out the corresponding access connection and activate it.

The validity of the approval may be ensured with cryptographic authorization. A shared secret key may be stored in the networking device and mobile application of the mobile device of the owner. When the approval is needed, the networking device creates a random challenge sequence for the mobile app to encrypt. Then, the networking device compares the same encrypted version locally and the version sent from mobile app of the mobile device of the owner in order to make sure the validity of approval.

The embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

What is claimed is:

1. A networking device, comprising:
   one or more privacy features;
   a command detecting unit configured to receive one or more signals and convert the one or more signals to a command for disabling or enabling the one or more privacy features of the networking device;
   a storage unit configured to store one or more predefined commands for disabling and enabling the one or more privacy features of the networking device;
   a processor configured to:
   determine whether the converted command is one of the predefined commands for disabling or enabling the one or more privacy features of the networking device;
   disable the one or more privacy features of the networking device when the converted command is one of the predefined commands for disabling the one or more privacy features of the networking device;
   enable the one or more privacy features of the networking device when the converted command is one of the predefined commands for enabling the one or more privacy features of the networking device; and
   an indicating unit configured to bear a noticeable appearance when the one or more privacy features are disabled;
   wherein the command detecting unit comprises a communication module configured to communicate through a short-range or mid-range communication channel with a remote-control unit for facilitating a user to generate one or more remote-control signals and is configured to convert the generated remote-control signals to the command for disabling or enabling the one or more privacy features of the networking device; and
   wherein the one or more privacy features are one or more internet access features; and
   wherein the processor is further configured to:
   disable the one or more internet access features by adding random data into input and output data of the one or more internet access features into a non-renderable state;
   make the randomness and non-renderable state of the input and output data indistinguishable from being due to encryption or transmission errors; and
   prevent a privacy invader from obtaining any hints on whether the user is aware of being snooped during the disabling of the one or more internet access features by the user.

2. The networking device of claim 1, wherein:
   the one or more privacy features include an internet access module;
   and the networking device is configured to be able to operate locally when the internet access module is disabled.

3. The networking device of claim 1, wherein:
   the one or more privacy features include an image sensor; and
   the networking device is configured to be unable to capture image or video signals when the image sensor is disabled while the networking device is operating partially without image and video signals.

4. The networking device of claim 1, wherein:
   the one or more privacy features include a microphone sensor; and
   the networking device is not able to capture audio signals when the microphone sensor is disabled while the networking device is operating partially without audio signal.

5. The networking device of claim 1, wherein:
   the command detecting unit further comprises a physical state-selection means for facilitating a user to generate one or more state-selection signals and is configured to convert the generated state-selection signals to the command for disabling or enabling the one or more privacy features of the networking device.

6. The networking device of claim 5, wherein:
   the physical state-selection means is a push button; and
   the indicating unit comprises a noticeable mark positioned on the push button or next to the push button.

7. The networking device of claim 5, wherein:
   the physical state-selection means is a push button; and
   the indicating unit comprises a noticeable mark positioned on the slide switch or next the slide switch.

8. The networking device of claim 1, wherein:
   the command detecting unit further comprises an image capturing device configured for capturing facial expression or body gestures of a user and is configured to convert the captured facial expression or body gestures of the user to the command for disabling or enabling the one or more privacy features of the networking device; and
   the indicating unit is a LED.

9. The networking device of claim 1, wherein:
   the command detecting unit further comprises a video capturing device configured for detecting direction of movement of a user relative to a reference position and is configured to convert the detected direction of movement of the user to the command for disabling or enabling the one or more privacy features of the networking device; and
   the indicating unit is a LED.

10. The networking device of claim 9, wherein:
the reference position is at a boundary of a monitoring area; and
the command detecting unit is further configured to convert the detected direction of movement to:
a command for disabling the one or more privacy features of the networking device when the user is entering the monitoring area;
and a command for enabling the one or more privacy features of the networking device when the user is leaving the monitoring area.

11. The networking device of claim 1, wherein:
the command detecting unit further comprises a sound capturing device configured for capturing voices or sounds from a user or a monitoring area and is configured to convert the captured voices or sounds to the command for disabling or enabling the one or more privacy features of the networking device; and
the indicating unit is a LED.

12. The networking device of claim 1, wherein:
the command detecting unit further comprises a socket configured for receiving a pluggable module and is configured to convert a plugging/unplugging of the pluggable module to the command for disabling or enabling the one or more privacy features of the networking device; and
the indicating unit is a mark on the pluggable module.

13. The networking device of claim 1, wherein the command detecting unit is further configured to detect availability of connectivity between the networking device and a mobile device of a registered user through a short-range network and convert the detected availability of connectivity to a command for disabling the one or more privacy features of the networking device.

14. The networking device of claim 1, wherein the command detecting unit is further configured to establish a plurality of connections with a number of mobile devices and receive a command from a mobile device of a registered user to disable the one or more privacy features on basis of an active connection which is selected by the registered user.

15. The networking device of claim 14, wherein the command detecting unit is further configured to transmit a list of historical and active connections to the mobile device of the registered user and to receive a command to stop the selected active connection from the mobile device of the registered user.

16. The networking device of claim 14, wherein the command detecting unit is further configured to transmit a notification to the mobile device of the registered user when the one or more privacy features are accessed by a user other than the registered user.

17. The networking device of claim 1, wherein:
the command detecting unit is further configured to:
transmit a notification signal to a mobile device of a registered user when a command is converted from one or more signals which are not received from a non-reversable means and the converted command is determined to be one of the predefined commands for disabling the one or more privacy features of the networking device; and
receive, from the mobile device of the registered user, a command associated with the notification signal; and
the processor is further configured to enable the one or more privacy features of the networking device if the command associated with the notification signal is a cancel command associated with the notification signal received by the command detecting unit.

18. The networking device of claim 17, wherein the non-reversable means is a physical state-selection means installed in the networking device, a remote-control unit, or a pluggable module.

19. The networking device of claim 1, further comprising a controlling platform configured to:
allow different users access the device through a communication network from their mobile devices to control the one or more privacy features; and
provide a user interface for an owner to set up an owner's account and associate the owner's mobile phone number to the owner's account.

* * * * *